US010468665B2

United States Patent
Ivanov et al.

(10) Patent No.: US 10,468,665 B2
(45) Date of Patent: Nov. 5, 2019

(54) COMPOSITE MATERIALS

(71) Applicant: SIGMA LITHIUM LIMITED, Abingdon (GB)

(72) Inventors: Gleb Ivanov, Oxford (GB); Sergey Mochalov, Ufa (RU); Azat Nurgaliev, Ufa (RU); Aleksei Ivanov, Ufa (RU); Elena Kuzmina, Ufa (RU); Elena Karaseva, Ufa (RU); Vladimir Kolosnitsyn, Ufa (RU)

(73) Assignee: SIGMA LITHIUM LIMITED, Abingdon (GB)

( * ) Notice: Subject to any disclaimer, the term of this patent is extended or adjusted under 35 U.S.C. 154(b) by 0 days.

(21) Appl. No.: 15/547,243

(22) PCT Filed: Jan. 29, 2016

(86) PCT No.: PCT/RU2016/000031
§ 371 (c)(1),
(2) Date: Jul. 28, 2017

(87) PCT Pub. No.: WO2016/122353
PCT Pub. Date: Aug. 4, 2016

(65) Prior Publication Data
US 2018/0013126 A1    Jan. 11, 2018

(30) Foreign Application Priority Data
Jan. 29, 2015   (GB) .................................. 1501507.6

(51) Int. Cl.
*H01M 4/04*    (2006.01)
*H01M 4/134*   (2010.01)
(Continued)

(52) U.S. Cl.
CPC ......... *H01M 4/0423* (2013.01); *H01M 4/134* (2013.01); *H01M 4/1395* (2013.01);
(Continued)

(58) Field of Classification Search
CPC .. H01M 4/0423; H01M 4/134; H01M 4/1395; H01M 4/382; H01M 4/0435
See application file for complete search history.

(56) References Cited

U.S. PATENT DOCUMENTS 5,522,955 A    6/1996  Brodd
6,794,087 B2   9/2004  Choi
(Continued)

FOREIGN PATENT DOCUMENTS

CN   103794800   5/2014
CN   103972470   8/2014
(Continued)

OTHER PUBLICATIONS

International Search Report dated Jul. 1, 2016, in International PCT Application PCT/RU2016/00031.
(Continued)

*Primary Examiner* — Matthew J Merkling
(74) *Attorney, Agent, or Firm* — Wenderoth, Lind & Ponack, L.L.P.

(57) ABSTRACT

A permeable composite material for making an electrode for an electrochemical cell, the composite material comprising: a support defining pores; and alkali metal deposited on the support within a plurality of said pores. An electrode comprising the composite material is also described, as are methods of making the material and cells and assemblies comprising the electrode.

21 Claims, 5 Drawing Sheets

(51) Int. Cl.
*H01M 4/1395* (2010.01)
*H01M 4/38* (2006.01)
*H01M 10/052* (2010.01)
*H01M 4/02* (2006.01)

(52) U.S. Cl.
CPC .......... *H01M 4/382* (2013.01); *H01M 4/0435* (2013.01); *H01M 4/381* (2013.01); *H01M 10/052* (2013.01); *H01M 2004/021* (2013.01)

(56) References Cited

U.S. PATENT DOCUMENTS

| | | | |
|---|---|---|---|
| 9,346,066 B2* | 5/2016 | Huang | D01D 5/0069 |
| 2003/0003364 A1 | 1/2003 | Mori et al. | |
| 2004/0072066 A1 | 4/2004 | Cho et al. | |
| 2011/0059361 A1* | 3/2011 | Wilkening | H01M 4/136 429/218.1 |
| 2013/0295452 A1 | 11/2013 | Ryu et al. | |
| 2013/0323603 A1 | 12/2013 | Ryu et al. | |

FOREIGN PATENT DOCUMENTS

| | | |
|---|---|---|
| EP | 0 205 913 | 12/1986 |
| EP | 2 629 352 | 8/2013 |
| EP | 2 942 827 | 11/2015 |
| EP | 2 942 828 | 11/2015 |
| KR | 10-1353262 | 1/2014 |
| WO | 02/061863 | 8/2002 |
| WO | 2011/152244 | 12/2011 |
| WO | 2013/007420 | 1/2013 |
| WO | 2013/121164 | 8/2013 |

OTHER PUBLICATIONS

Written Opinion of the International Searching Authority dated Jul. 1, 2016, in International (PCT) Application No. PCT/RU2016/000031.

* cited by examiner (a)

(b)

COMPOSITE MATERIALS

FIELD OF THE INVENTION

This invention relates to composite materials useful in making electrodes for electrochemical cells. In particular, though not exclusively, this invention relates to a permeable composite material, a method of making the composite material, an electrode for a cell comprising the composite material, and an electrode assembly or cell comprising the electrode.

BACKGROUND TO THE INVENTION

Graphite and other allotropes of carbon are the most widely used types of material used in the electrodes of batteries. However, in recent years, attention has turned to the development of electrodes from materials such as silicon, silicon-carbon composites, and lithium. Alkali metals, in particular lithium, are known to have the highest specific energy of all known electrode materials, making them a promising choice of material for use in the electrodes of batteries.

When metallic lithium is employed in the negative electrode of a battery, it is possible to use a wide variety of active materials in the positive counter-electrode. Such materials include non-lithiated manganese dioxide, vanadium dioxide, in addition to elements such sulphur, phosphorus, selenium, and so forth.

Furthermore, the use of metallic lithium as a negative electrode can significantly increase the specific energy of a battery. For example in a battery with lithium phosphate as the positive electrode, substituting a graphite negative electrode with a metallic lithium electrode can result in a 30% increase in the specific energy of the battery.

There are a number of drawbacks associated with the use of metallic lithium in electrodes. Metallic lithium is an extremely soft, plastic material that can easily be moulded into shape by pressing, extrusion and calendaring. However, handling metallic lithium during the manufacture of electrodes is a challenging task, since it adheres strongly to many of the structural materials involved. It can also be difficult to prevent bending and tearing, due to the low mechanical strength and extreme softness of metallic lithium.

Once assembled into an electrochemical cell, metallic lithium is prone to dendrite formation during battery charge. Dendrites are finely dispersed microscopic fibres or parts of lithium that are formed near the surface of the electrode. They are essentially excluded from involvement in the electrochemical processes occurring in the cell, and therefore reduce the specific energy of the battery. In some cases the dendrites can even reach the opposite electrode, resulting in potentially dangerous short-circuiting of the battery.

A further problem associated with dendrite formation is excessive reduction of the electrolyte by lithium. This results in passivation of the metallic lithium electrode and a need to increase the amount of electrolyte, which therefore reduces the specific energy of the battery.

There is an ever-present demand for increasingly smaller batteries that can supply power for longer periods of time, without the need for recharging. In particular, such batteries are highly desirable in portable electronic devices, for example smartphones and tablets, as they allow for more flexible and compact designs, whilst improving the performance of the device. In order to meet this need, it is necessary to find ways to increase the specific energy of batteries.

The specific energy of a battery or cell can be increased by reducing the overall mass of metallic lithium present in the electrode as much as possible, whilst maintaining the electrical capacity of the battery. This is typically achieved through the use of lithium foils, which can be calendared to reduce their thickness. However, due to the poor mechanical properties of metallic lithium, such technologies are only well developed for the preparation of lithium foils down to a thickness of 100 µm.

WO 2013/121164 describes a method for improving the mechanical properties of metallic lithium by incorporating polymer meshes as a reinforcement material. A sheet of polypropylene is placed between two sheets of lithium foil and the layers are pressure bonded together by calendaring. This method allows for the preparation of an electrode with a thickness of about 60 µm.

However, the manufacture of such electrodes using this method still presents a number of technical difficulties, for example such as handling lithium foils. Furthermore, the electrochemical properties of such electrodes leave room for improvement.

It is an object of the invention to address at least one of the above problems, or another problem associated with the prior art.

STATEMENTS OF THE INVENTION

Aspects of the invention provide a composite material for an electrode, the composite material comprising: a support defining pores; and an alkali metal deposit on the support.

According to a first aspect of the invention, there is provided a permeable composite material, in particular a composite material for (making or forming) an electrode for an electrochemical cell, the composite material comprising: a support defining pores; and an alkali metal deposit on the support within a plurality of said pores.

It has been found that such a composite can offer desirable electrochemical performance where used as an electrode in an electrochemical cell. Without wishing to be bound by theory, compared to impermeable materials, the permeable composite material provides improved conditions for an electrochemical reaction to be performed equally on both sides of the electrode. This can allow for highly effective use of the composite material in or as an electrode, and improvement in the electrochemical behaviour of a complete electrochemical system such as extension of the cycle life and increase in energy density.

By virtue of the support, the composite material has additional strength compared to unsupported alkali metal. Furthermore, deposition of the alkali metal in the pores of the support provides for advantageous dispersion of the alkali metal, which can in turn enhance specific energy and provide desirable electrochemical properties in the context of an electrode in a cell.

The composite material can thus offer the structural advantages of being mechanically strong and lightweight, yet with the electrochemical advantages stemming from permeability and a dispersed alkali metal deposit.

The composite material is porous and comprises a plurality of open pores. In general, a high porosity is preferred, so long as this is balanced with other desired properties of the material, e.g. mechanical strength.

Suitably, the porosity of the composite material may be at least 1% v/v, or at least 2% v/v, or at least 4% v/v, or at least 6% v/v, or at least 8% v/v, or at least 10% v/v or even at least 11% v/v, as measured according to Experimental Method 1 defined hereinbelow.

Suitably, the porosity of the composite material may be at most 95%, or at most 70% v/v, or at most 50% v/v, or at most 30% v/v, or at most 25% v/v, or at most 20% v/v, or at most 17% v/v or even at most 15% v/v, as measured according to Experimental Method 1 defined hereinbelow.

In one embodiment, the composite material may advantageously have a porosity in the range of from 1% to 95% v/v, or 1% to 70% v/v, or 1% to 50% v/v, or 1% to 30% v/v, or 1% to 25% v/v, or 1% to 20% v/v, or 1% to 17% v/v, or 1% to 15% v/v.

In another embodiment, the composite material may advantageously have a porosity in the range of from 2% to 95% v/v, or 2% to 70% v/v, or 2% to 50% v/v, or 2% to 30% v/v, or 2% to 25% v/v, or 2% to 20% v/v, or 2% to 17% v/v, or 2% to 15% v/v.

In another embodiment, the composite material may advantageously have a porosity in the range of from 4% to 95% v/v, or 4% to 70% v/v, or 4% to 50% v/v, or 4% to 30% v/v, or 4% to 25% v/v, or 4% to 20% v/v, or 4% to 17% v/v, or 4% to 15% v/v.

In another embodiment, the composite material may advantageously have a porosity in the range of from 6% to 95% v/v, or 6% to 70% v/v, or 6% to 50% v/v, or 6% to 30% v/v, or 6% to 25% v/v, or 6% to 20% v/v, or 6% to 17% v/v, or 6% to 15% v/v.

In another embodiment, the composite material may advantageously have a porosity in the range of from 8% to 95% v/v, or 8% to 70% v/v, or 8% to 50% v/v, or 8% to 30% v/v, or 8% to 25% v/v, or 8% to 20% v/v, or 8% to 17% v/v, or 8% to 15% v/v.

In another embodiment, the composite material may advantageously have a porosity in the range of from 10% to 95% v/v, or 10% to 70% v/v, or 10% to 50% v/v, or 10% to 30% v/v, or 10% to 25% v/v, or 10% to 20% v/v, or 10% to 17% v/v, or 10% to 15% v/v.

In another embodiment, the composite material may advantageously have a porosity in the range of from 11% to 95% v/v, or 11% to 70% v/v, or 11% to 50% v/v, or 11% to 30% v/v, or 11% to 25% v/v, or 11% to 20% v/v, or 11% to 17% v/v, or 11% to 15% v/v.

In another embodiment, the composite material may advantageously have a porosity in the range of from 35% to 95% v/v, or 35% to 70% v/v, or 35% to 50% v/v.

In another embodiment, the composite material may advantageously have a porosity in the range of from 50% to 95% v/v, or 50% to 85% v/v, or 50% to 75%.

The pores of the composite material may be of any suitable size. In an embodiment, the composite material may comprise micropores with a size smaller than 2 nm, mesopores with a size in the range of from 2 and 50 nm, macropores with a width larger than 50 nm, or combinations thereof.

In an embodiment, the composite material has a mean flow pore size in the range of from 1 nm to 300 µm, such as in the range of from 10 nm to 1 µm, in particular in the range of from 20 nm to 200 nm, more in particular in the range of from 30 nm to 100 nm.

Suitably at least 50%, or even at least 90%, of the total volume of pores in the composite material may be made up of pores with a size of at most 100 µm, preferably at most 1 µm, more preferably at most 500 nm.

To provide for permeability in the composite material, the support defines through pores from a first side of the support to a second side of the support and the alkali metal is deposited on the support such that at least one through pore, and preferably a plurality of through pores, is retained in the composite material. Suitably, the alkaline metal may be deposited within one or more through pores without blocking said pores. Additionally or alternatively, the alkaline metal may be deposited in only some of the through pores of the support.

The through pores may be of any shape. Typically the through pores may be tortuous pores, for example defined by interstices in the support. In an embodiment, the through pores are defined by one or more internal walls of the support of the composite material, optionally with alkali metal deposited thereon.

The composite material is permeable in the sense that electrolyte can pass from a first side of the material to a second side of the material, e.g. under the conditions set out in Experimental Method 2 set out hereinbelow.

A degree of permeability can be measured according to the Japanese Industrial Standard 8117:1998 Gurley (JIS Gurley). JIS Gurley is defined as the time in seconds required for 100 cc of air to pass through one square inch of film at constant pressure of 4.8 inches of water. Suitably, the composite material may have a JIS Gurley value in the range of from 10 to 5000 sec, or more preferably in the range of from 30 to 2000 sec, or even more preferably in the range of from 50 to 1000 sec.

In general, a high permeability is preferred, provided this is balanced with other desired properties of the material, e.g. mechanical strength.

The composite material may suitably be generally planar with opposed faces defining a thickness of the material. Conveniently, the composite material may be a sheet.

The thickness of the composite material may be chosen consistent with balancing permeability, mechanical strength and metal loading or specific energy (for electrode use). In an embodiment, the composite material has a thickness in the range of from 1 to 500 µm, such as in the range of from 10 to 150 µm, or even in the range of from 15 to 80 µm. In an embodiment, the composite material has a thickness of at most 59 µm, in particular at most 57 µm or at most 55 µm or even at most 40 µm.

The composite material may advantageously have a tensile strength in the range of from 100 to 5000 kg/cm$^2$, in particular 100 to 2500 kg/cm$^2$, such as in the range of from 100 to 1000 kg/cm$^2$, or even in the range 100 to 150 kg/cm$^2$ Suitably, the mass ratio of alkali metal to support in the composite material may be in the range of from 5:95 w/w to 95:5 w/w. In some embodiments the mass ratio may be in the range of from 5:95 w/w to 50:50 w/w, in particular 5:95 w/w to 30:70 w/w. In some embodiments the mass ratio may be in the range of from 50:50 w/w to 95:5 w/w, in particular 70:30 w/w to 95:5 w/w.

In an embodiment, the amount of alkali metal deposited on the support is in the range of from 1 to 20 mAh per cm$^2$ of support, in particular in the range of from 2 to 1 to 20 mAh per cm$^2$ of support or in the range of from 4 to 12 mAh per cm$^2$ of support.

The support may be any suitable porous material. Preferably the support may be non-metallic, i.e. substantially devoid of metal. Advantageously, the support may comprise or consist of an electrically non-conducting material, e.g. having an electrical resistivity (Ohm·m) at 20° C. of at least 100, preferably at least $1 \times 10^5$, more preferably at least $1 \times 10^{10}$, yet more preferably at least $1 \times 10^{12}$, even more preferably at least $1 \times 10^{14}$. Without wishing to be bound by theory, metal or conducting support materials can become exposed to electrolyte during cycling of a cell in use and become a centre for dendrite growth.

Conveniently, the support may comprise or consist of a polymeric material. In an embodiment the polymeric material is formed from one or more ethylenically unsaturated monomers. Suitable polymeric materials include polystyrols, polyolefins or combinations thereof. In an embodiment, the polymeric material comprises polypropylene and/or polyethylene. A preferred polymeric material is polypropylene.

Advantageously, the support may be fibrous, i.e. comprise one or more fibres. Conveniently, the fibrous support may comprise or consist of a woven or non-woven material. The fibrous material may suitably be formed from fibres of a non-conducting material, such as polymer fibres. Advantageously, the fibres may deform plastically under pressure while maintaining their integrity and mechanical strength. Examples include non-woven fabrics, woven fabrics and mesh (e.g. polymer mesh). Suitable fabrics include polymer fabrics, such as polyalkylene fabrics, polyamides (capron), and nylon. Polypropylene fabrics, in particular polypropylene non-woven fabrics are preferred.

The support may comprise or consist of inherently porous material. Alternatively or additionally, pores may be introduced into the support, for example, by perforating the support by mechanical means.

In an embodiment, the support may comprise or consist of a material that has a density of less than 6 $g/cm^3$, preferably less than 4 $g/cm^3$, more preferably less than 2 $g/cm^3$, and even more preferably less than 1.5 $g/cm^3$. In one embodiment, the support may have or may be formed from a material that has a density of at least 0.5 $g/cm^3$, preferably at least 0.7 $g/cm^3$, more preferably at least 0.8 $g/cm^3$ and even more preferably at least 0.9 $g/cm^3$. In a preferred embodiment, the support has a density of 1 to 1.2 $g/cm^3$. By using a material having a relatively low density, the overall mass of composite material may be reduced, improving specific energy.

Suitably, the porosity of the support may be at least 1% v/v, or at least 2% v/v, or at least 4% v/v, or at least 6% v/v, or at least 8% v/v, or at least 10% v/v or even at least 11% v/v, as measured according to Experimental Method 1 defined hereinbelow.

Suitably, the porosity of the support may be at most 95% v/v, or at most 85% v/v, or at most 70% v/v, or at most 50% v/v, or at most 35% v/v, or at most 30% v/v, or at most 25% v/v, or at most 22% v/v or even at most 20% v/v, as measured according to Experimental Method 1 defined hereinbelow.

The pores of the support may be of any suitable size. In an embodiment, the support may comprise micropores with a size smaller than 2 nm, mesopores with a size in the range of from 2 and 50 nm, macropores with a width larger than 50 nm, or combinations thereof.

In an embodiment, the support has a mean flow pore size in the range of from 1 nm to 300 µm, such as in the range of from 10 nm to 1 µm, in particular in the range of from 20 nm to 200 nm, more in particular in the range of from 30 nm to 100 nm.

Suitably at least 50%, or even at least 90%, of the total volume of pores in the support material may be made up of pores with a size of at most 100 µm, preferably at most 1 µm, more preferably at most 500 nm.

To provide a permeable composite material, the support is permeable. In an embodiment, the support may have a JIS Gurley value in the range of from 10 to 5000 sec, or more preferably in the range of from 30 to 2000 sec, or even more preferably in the range of from 50 to 1000 sec.

The support defines through pores from a first side of the support to a second side of the support. The through pores may be of any suitable shape. Typically the through pores may be tortuous pores, for example defined by interstices in the support.

The support is permeable in the sense that electrolyte can pass from a first side of the material to a second side of the material, e.g. under the conditions set out in Experimental Method 2 set out hereinbelow.

The support may suitably be generally planar with opposed faces defining a thickness of the material. Conveniently, the support may be a sheet.

In an embodiment, the support has a thickness in the range of from 1 to 500 µm, such as in the range of from 2 to 100 µm, or even in the range of from 10 to 60 µm.

The support may advantageously have a tensile strength in the range of from 100 to 5000 $kg/cm^2$, in particular 100 to 2500 $kg/cm^2$, such as in the range of from 100 to 1000 $kg/cm^2$, or even in the range 100 to 150 $kg/cm^2$.

The alkali metal deposit may be any alkali metal deposited on the support. The alkali metal may be deposited not only in pores of the support but also on other parts thereof. Conveniently, the alkali metal may be deposited on one or more faces of the support.

Suitably, the alkali metal may be deposited on substantially the entirety of one or more faces of the support. Advantageously, the alkali metal may be deposited on opposed faces of the support, preferably on substantially the entirety of the faces. In an embodiment, the alkali metal may be deposited on a single face of the support. In an embodiment, alkali metal is deposited on substantially the entire surface of the support.

The alkali metal may advantageously comprise or consist of lithium and/or sodium (e.g. metal or alloy). Preferably, the alkali metal may comprise or consist of lithium metal or a lithium alloy. In one embodiment, the alkali metal consists essentially of lithium.

The alkali metal may conveniently be deposited on the support, in particular one or more porous faces thereof, as an adherent and/or conformal coating or deposit.

The composite material may in principle be made using any suitable process. Suitably, the alkali metal may be vapour deposited and/or vacuum deposited onto the support. In an embodiment, the alkali metal is a physical vapour deposition deposit.

Indeed, according to a another aspect of the invention, there is provided a composite material, in particular a composite material for making an electrode for an electrochemical cell, the composite material comprising: a support defining pores; and alkali metal, vapour and/or vacuum deposited on the support. The composite material, support and alkali metal may each independently be as described or defined anywhere hereinabove.

The composite material may optionally be calendared. Thus the composite material may or may not have been subjected to calendaring.

Aspects of the invention provide a method of making a composite material for making an electrode, the method comprising: providing a support comprising pores; and depositing alkali metal onto the support to form the composite material.

According to a second aspect of the invention, there is provided a method of making a permeable composite material for making an electrode, the method comprising: providing a support comprising pores; and depositing alkali metal onto the support within a plurality of said pores to form the composite material.

The composite material, support and alkali metal may each independently be as described or defined anywhere hereinabove.

In an embodiment, the method comprises exposing the support to a source of alkali metal vapour under a vacuum to deposit the alkali metal.

Advantageously, the method may comprise physical vapour deposition of the alkali metal.

Suitably, the method may comprise: evaporating alkali metal and depositing the evaporated lithium onto the support under a vacuum.

Alkali metals, such as lithium, have a high chemical reactivity and are able to react with a great variety of substances including atmospheric components such as oxygen, nitrogen and carbon dioxide. Accordingly, vacuum processing of alkali metals generally takes place under high vacuum conditions that will prevent the alkali metal from reacting with components of atmosphere to form a passivation layer. Such conditions are aimed facilitate formation of metallic alkali metal rather than formation of lithium reaction products on a substrate.

However, it has now been found that, surprisingly, a relatively low vacuum with a pressure up to $10^{-2}$ mbar a can enable effective and safe deposition of alkali metal onto a porous substrate. Such a relatively low vacuum with a pressure up to 0.1 mbar a has the advantage of reduced cost but has hitherto been considered unsuitable for lithium deposition.

Suitably, the vacuum may have a pressure in the range of from $10^{-3}$ mbar a to 0.1 mbar a, or in the range of from $10^{-3}$ mbar a to $5 \times 10^{-2}$ mbar a, or $10^{-3}$ mbar a to $10^{-2}$ mbar a.

A higher vacuum may also be used if desired. For example, in an embodiment, the vacuum may be defined by a pressure of at most $10^{-3}$ mbar a. Suitably, the vacuum may have a pressure in the range of from $10^{-6}$ mbar a to $10^{-3}$ mbar a.

The method may comprise an advantageously rapid rate of deposition. In an embodiment, the alkali metal is deposited at a rate in the range of from 1 to 10 mAh per $cm^2$ of support per minute, such as in the range of from 2 to 8 mAh per $cm^2$ of support per minute, or even in the range of from 3 to 5 mAh per $cm^2$ of support per minute. In an embodiment the alkali metal may be deposited at a rate of 4 mAh per $cm^2$ support per minute.

Without wishing to be bound by theory, it is believed that such a rapid rate of deposition facilitates the use of relatively low vacuum conditions. In particular, alkali metal deposition on the support may advantageously be faster than its interaction with the components of atmosphere present in the vacuum. In such a case only small proportion of lithium (0.1-1%) may react with residual atmospheric gases in the chamber.

Advantageously, the method may comprise evaporating alkali metal under a pulsed application of heat and depositing the evaporated lithium onto the support under a vacuum. Pulsed application of heat may be achieved, for example, by means of passing a pulsed electric current to an electric heater arranged to heat the alkali metal.

It has surprisingly been found that pulsed evaporation of alkali metal is helpful in breaking up any passivation layer that may have formed on the alkali metal, in particular under low vacuum conditions. Accordingly, pulsed application of heat to the alkali metal can enable vapour deposition of alkali metal in low pressure conditions hitherto considered to lead to prohibitive levels of passivation that interfere with (continuous) evaporation.

Suitably, the pulsed application of heat may be at a frequency in the range of from 0.05 to 10 Hz.

The method may optionally comprise calendaring or pressing the composite material. Suitable calendaring conditions include a rotation speed in the range of 1 to 100 cm/min and a roll gap in the range of from 1 to 500 μm, such as in the range of from 30 to 100 μm, or even in the range of from 50 to 70 μm.

The method may comprise making an electrode from the composite material, suitably by combining the material with a connector terminal and/or current collector.

The method may also comprise making an electrode assembly or electrochemical cell from the electrode.

Aspects of the invention provide an electrode for an electrochemical cell, the electrode comprising a composite material according to any aspect or embodiment of the invention or obtainable by any a method according to any aspect or embodiment of the invention.

According to a third aspect of the invention, there is provided an electrode for an electrochemical cell, the electrode comprising a composite material according to any aspect or embodiment of the invention, or obtainable by any method according to any aspect or embodiment of the invention; and a connection terminal.

In an embodiment, the electrode is a negative electrode.

In an embodiment, the electrode comprises a current collector. The current collector may suitably be a porous current collector, comprising, for example, a conductive metal layer or conductive metal mesh. Suitable conductive metals include stainless steel, nickel and copper.

The electrode may be used in any suitable lithium battery. Examples of suitable lithium batteries include those having cathodes based on transition metal compounds, such as transition metal oxides, sulphides or halides. Specific examples include Li—$MnO_2$ and Li—$FeS_2$ cells. Other examples include lithium cells in which the cathode is based on sulphur dioxide, thionyl chloride, sulfuryl chloride, halogen (e.g. iodine) and carbon monofluoride. Specific examples include Li—$SO_2$, Li—$SOCl_2$, Li—$SO_2Cl_2$, Li—$(CF)_x$ and Li—$I_2$ cells.

Aspects of the invention provide an electrode assembly or cell comprising an electrode according to any aspect or embodiment of the invention.

Embodiments of the electrode comprising composite material with permeability are of particular advantage in this context.

The electrode may, for example, be used in an electrode assembly, such as a stack including consecutively positioned layers of positive and negative electrodes separated with layers of a separator.

Where an electrode does not have porosity, the electrochemical reaction will get localised only on the electrode surface. Given that industrially manufactured electrodes always have some variation in parameters, the distribution of electrochemical reactions on the surface of non-porous electrodes is likely to be non-uniform. Thus, during prolonged electrode cycling, areas with higher current densities will experience faster degradation than those will lower current densities, resulting in faster degradation.

The use of a permeable electrode results in a more uniform distribution of electrochemical reactions because the electrolyte and ions can penetrate to the opposite side of the electrode through its porous structure According to a fourth aspect of the invention, there is provided an electrode assembly comprising an anode, a cathode and a separator positioned therebetween, wherein the anode is an electrode according to any aspect or embodiment of the invention. An electrolyte may suitably be present between the anode and cathode, and in the pores of the anode.

The separator may suitably be in physical contact with the anode and/or cathode. The electrode assembly or a stack of electrode assemblies may conveniently be sealed in a casing, with connection terminals of the electrodes accessible for application of a potential difference across the anode(s) and cathode(s).

According to a fifth aspect, the invention provides an electrochemical cell comprising an electrode or electrode assembly according to any aspect or embodiment of the invention.

The electrochemical cell may be a primary cell. Preferably, however, the electrochemical cell is a secondary cell.

The electrochemical cell may include at least one anode and at least one cathode in an electrolyte. The anode is preferably an electrode according to any aspect or embodiment of the invention. The cell may include a plurality of anodes and a plurality of cathodes. Preferably all the anodes of the cell are formed of an electrode according to any aspect or embodiment of the invention. A separator may be placed in between the anode and the cathode. The separator may be in contact with the anode and/or the cathode. The cell may be sealed in a housing, with the terminal of at least one of the anodes and at least one of the cathodes accessible for charge and/or discharge of the cell.

Where used, the separator may be formed of an electrically insulating material. Examples include polyethylene, polypropylene, polyamides, woven glass fabric etc.

The cell may suitably be a lithium ion cell. However, in one embodiment, the cell is not a lithium-ion cell. In one embodiment, the electrochemical cell is a lithium-sulphur cell comprising the electrode as the anode, a sulphur-containing cathode and an electrolyte. The sulphur-containing electrode may comprise a slurry comprising sulphur. The slurry may be deposited onto a conductive plate, such as a metal plate or foil. A suitable plate or foil may be formed of aluminium.

The slurry may be formed by mixing elemental sulphur with a support, such as a carbon support. A binder, for example, a polymeric binder may also be present. Suitable binders may be formed from at least one of, for example, polyethylene oxide, polytetrafluoroethylene, polyvinylidene fluoride, ethylene-propylene-diene rubber, methacrylate (e.g. UV-curable methacrylate), and divinyl esters (e.g. heat curable divinyl esters).

Throughout the description and claims of this specification, the words "comprise" and "contain" and variations of the words, for example "comprising" and "comprises", mean "including but not limited to", and do not exclude other moieties, additives, components, integers or steps. Moreover the singular encompasses the plural unless the context otherwise requires: in particular, where the indefinite article is used, the specification is to be understood as contemplating plurality as well as singularity, unless the context requires otherwise.

Preferred features of each aspect of the invention may be as described in connection with any of the other aspects. Other features of the invention will become apparent from the following examples. Generally speaking the invention extends to any novel one, or any novel combination, of the features disclosed in this specification (including any accompanying claims and drawings). Thus features, integers, characteristics, compounds, chemical moieties or groups described in conjunction with a particular aspect, embodiment or example of the invention are to be understood to be applicable to any other aspect, embodiment or example described herein unless incompatible therewith. Moreover unless stated otherwise, any feature disclosed herein may be replaced by an alternative feature serving the same or a similar purpose.

Where upper and lower limits are quoted for a property then a range of values defined by a combination of any of the upper limits with any of the lower limits may also be implied.

In this specification—unless stated otherwise—properties are measured under standard temperature and pressure.

The present invention will now be further described with reference to the following non-limiting examples and the accompanying illustrative drawings, of which:

Figure 4:
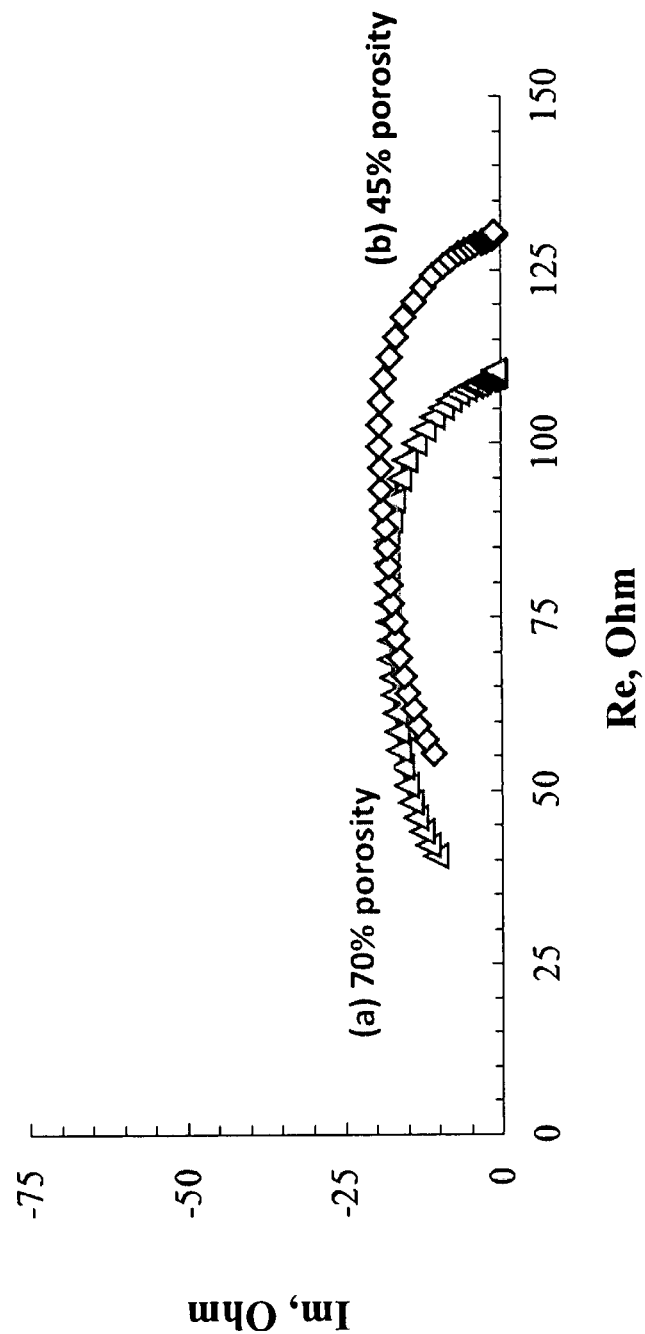
Figure 5:
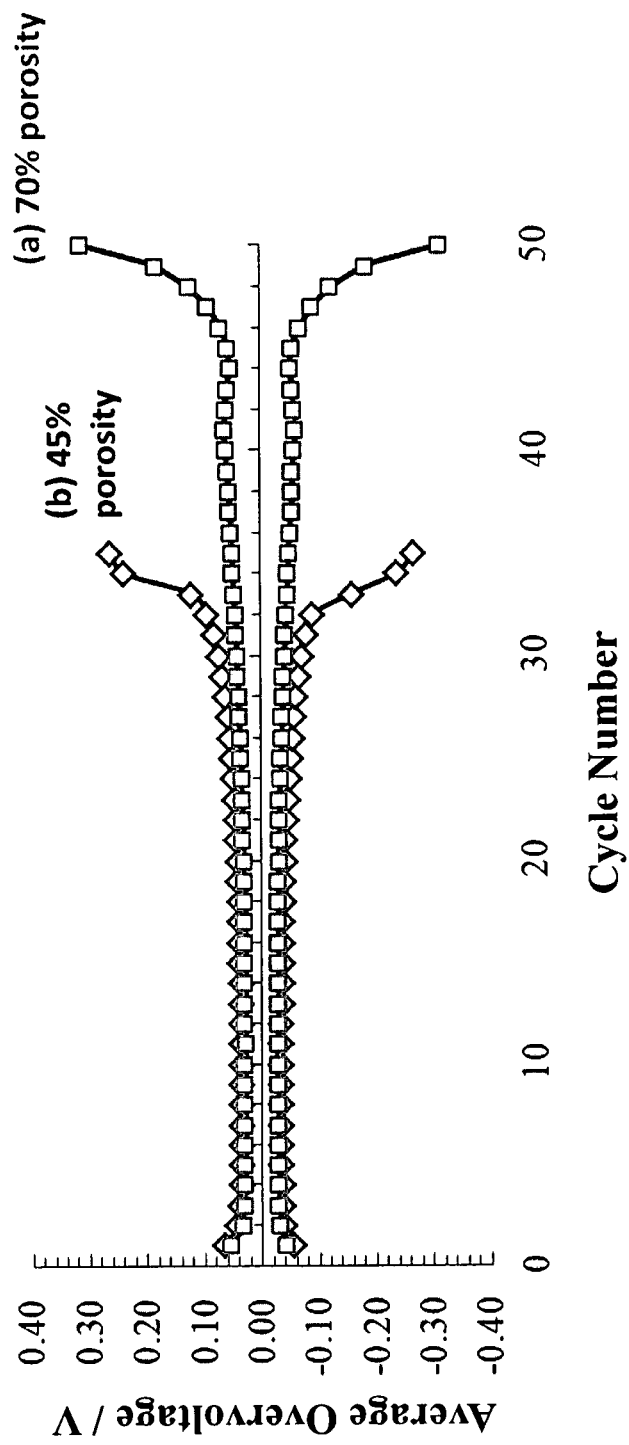

FIG. 4 is a comparison of the impedance data of a lithium half-cell assembled from the 70% porosity electrode of Example 2 and a lithium half-cell assembled from the 45% porosity electrode of Example 3; and FIG. 5 is a comparison of the average overvoltage of cycling for a lithium half-cell assembled from to the 70% porosity electrode of Example 2 and a lithium half-cell assembled from the 45% porosity electrode of Example 3.

EXAMPLES

Experimental Method 1—Porosity

Unless specified otherwise, porosity values of porous materials mentioned herein are determined according to the following method:

In a glovebox, under an inert argon atmosphere, a 1 cm$^2$ square sample was cut out and the thickness of the sample was measured using a micrometer.

The pores of the sample were washed with polypropylene carbonate (PC). Thereafter the pores of the sample were filled with PC. Further PC washes and vacuum were applied to the sample sequentially, several times, until the formation of micro-bubbles was no longer observed. A spatula was used to remove excess PC from the surface of the sample, and the resulting 'wet' sample was weighed.

The sample was then placed into a vacuum chamber and the PC was removed from the pores under vacuum (between 1.3 to 2.6 mbar a) at a temperature of 40 to 50° C. The sample was dried under vacuum for at least 24 hours, until its weight stabilised. The weight of the "dry" sample was then recorded.

Using the difference in weight of the sample when 'wet' and 'dry', the total weight of PC that was present in the pores of the 'wet' sample was calculated. The volume of PC present in pores of the sample was then calculated from the weight and known density of the PC.

The total volume of PC that was present in the pores is equal to the total volume of the pores. Therefore the porosity was determined as the ratio of pore volume to the total volume of the sample, obtained by multiplying 1 cm² by the thickness of the sample.

Experimental Method 2—Permeability

Unless specified otherwise, the permeability of materials is determined herein according to the following method:

A square 1 cm² sample was cut out and placed on dry filter paper. A drop of an electrolyte (1 M solution lithium perchlorate in sulfolane) was applied by pipette to the top side of the sample and left for 15 min, after which time any electrolyte remaining on the top side of the sample was removed using a cotton bud. The sample was then carefully removed from the filter paper. The presence of through pores, i.e. a permeable material, was confirmed where wetting of the filter paper underneath the sample was observed.

Example 1—Manufacture of a Porous Composite Lithium Electrode (12-14% Porosity)

A piece of non-woven polypropylene film having opposed faces with dimensions of 4 cm×6 cm and the properties shown in Table 1 was positioned inside a vacuum chamber at a pressure of 0.03 mbar a.

TABLE 1

| Property | SpanBel F |
|---|---|
| Thickness (μm) | 15 |
| Surface density (g/m²) | 20-25 |
| Porosity v/v (%) | 18-20% |
| Permeability | Yes |

Metallic lithium was evaporated from an evaporation unit at a temperature of 500° C. The evaporated metallic lithium was deposited on one side of the surface of the piece, which was kept between 20 and 50° C. The deposition rate was 4 mAh per cm² per min (Note: 1 g(Li)=3884 mAh). The total amount of metallic lithium deposited was about 4 mAh per cm² on each side.

Following deposition on one side, the piece was turned around and the deposition process was repeated. After deposition, the piece was calendared on a roller press to an overall thickness of 55 μm. The overall electrical capacity of the resulting electrode was determined to be 8 mAh/cm². The porosity of the resulting electrode was determined to be 12-14%.

To facilitate evaporation of metallic lithium where a passivation film was formed, the electric evaporation unit was operated in pulsed mode (on/off), at a frequency of 0.5 Hz.

Example 2—Manufacture of a Porous Composite Lithium Electrode (70% Porosity)

A piece of non-woven polypropylene film having opposed faces with dimensions of 4 cm×6 cm and the properties shown in Table 2 was positioned inside a vacuum chamber at a pressure of 0.03 mbar a.

TABLE 2

| Property | Mechanically modified Span Bel F |
|---|---|
| Thickness (μm) | 110 |
| Surface density (g/m²) | 13 |

TABLE 2-continued

| Property | Mechanically modified Span Bel F |
|---|---|
| Porosity v/v (%) | 88 |
| Permeability | Yes |

Low vacuum thermal deposition of metallic lithium onto the polypropylene film was carried out according to the general method of Example 1. The amount of lithium deposited was measured as 0.522 mg/cm² (per side), which is equivalent to a total amount of 2 mAh per cm² (per side). The deposition took about 2 minutes. The porosity of the resulting electrode was determined to be 70%.

To facilitate evaporation of metallic lithium where a passivation film was formed, the electric evaporation unit was operated in pulsed mode (on/off) at a frequency of 0.5 Hz.

Example 3—Manufacture of a Porous Composite Lithium Electrode (45% Porosity)

A piece of non-woven polypropylene film having opposed faces with dimensions of 4 cm×6 cm and the properties shown in Table 3 was positioned inside a vacuum chamber at a pressure of 0.03 mbar a.

TABLE 3

| Property | Mechanically modified Span Bel F |
|---|---|
| Thickness (μm) | 78 |
| Surface density (g/m²) | 13 |
| Porosity v/v (%) | 82 |
| Permeability | Yes |

Low vacuum thermal deposition of metallic lithium onto the polypropylene film was carried out according to the general method of Example 1. The amount of lithium deposited was measured as 0.722 mg/cm² (per side), which is equivalent to a total amount of 3 mAh per cm² (per side). The deposition took about 3 minutes. The porosity of the resulting electrode was determined to be 45%.

To facilitate evaporation of metallic lithium where a passivation film was formed, the electric evaporation unit was operated in pulsed mode (on/off) at a frequency of 0.5 Hz.

Example 4—Comparative—Manufacture of a Metallic Lithium Foil Electrode

A conventional negative electrode was cut from a smooth lithium foil having a thickness of 60 μm.

Example 5—Comparative—Manufacture of a Reinforced Metallic Lithium Foil Electrode A reinforced lithium electrode was prepared according to the method described in the Example of WO 2013/121164.

A sheet of lithium (Li) foil with a thickness of 60 μm was reinforced using a non-woven polypropylene (PP) sheet having a thickness of 50 μm. A Li/PP/Li composite having an initial thickness of 170 μm was formed and then rolled using steel rolls on a roll press.

After rolling, the final thickness of the electrode was 60 μm.

Comparison 1—Physical Properties of Porous and Foil Electrodes

The porosity, permeability and mechanical strength of the electrodes of Examples 1 to 5 were compared. The results are shown in Table 4:

TABLE 4

| Electrode | Example 1 | Example 2 | Example 3 | Example 4 | Example 5 |
|---|---|---|---|---|---|
| Porosity v/v (%) | 12-14% | 70% | 45% | 0% | 0% |
| Permeability | Yes | Yes | Yes | No | No |
| Mechanical strength | Good | Good | Good | Poor | Good |

Comparison 2—Electrochemical Properties of Porous and Foil Electrodes

The electrochemical properties of the electrodes of Examples 1, 4 and 5 were investigated by measuring their impedance spectra.

In each case a two-electrode cell was assembled from a pair of each type of electrodes and a separator soaked with electrolyte. Each electrode had opposed faces each having an area of 5 cm$^2$. The thickness of the separator was 200 to 220 μm. A 1 M solution of lithium perchlorate in sulfolane (15 to 20 μL per cm$^2$ of one of the opposed faces of one of the electrodes, i.e. 5 cm$^2$) was used as the electrolyte.

The electrical impedance of the cell was measured in the frequency range of 25 Hz to 100 kHz using a Solatron impedance spectrometer.

Figure 1A:
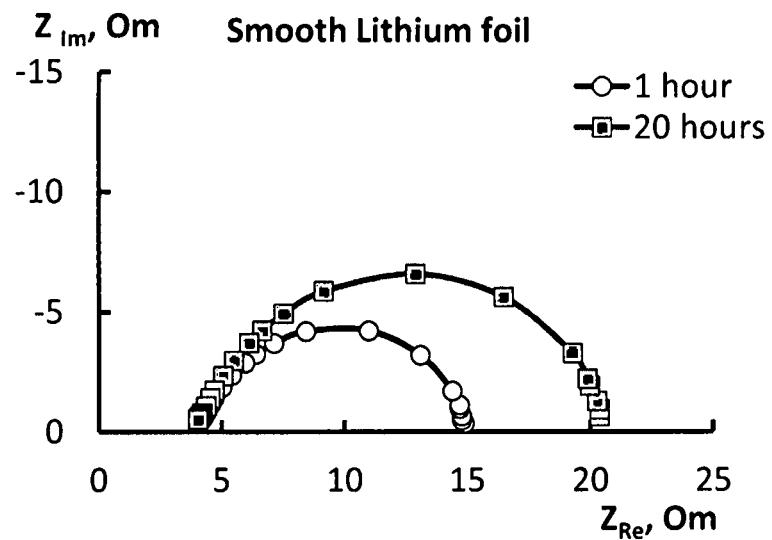
FIG. 1(a) shows impedance data of an electrode according to Example 4.

The results obtained in respect of the cell containing the electrode of Example 1 is shown in FIG. 1(a). In particular, FIG. 1(a) presents the impedance spectra of the cell containing the electrode of Example 1 at 1 h and 20 h after cell assembly.

Figure 1B:
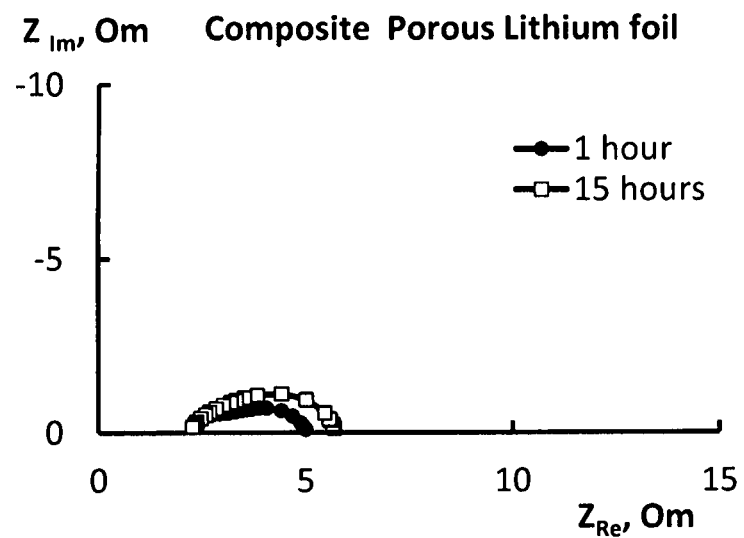
FIG. 1(b) shows impedance data of an electrode according to Example 1.

For comparison, the impedance spectra of a cell containing electrodes made from the electrode of Example 4 are presented in FIG. 1(b). In particular, FIG. 1(b) presents the impedance spectra of the cell containing the electrode of Example 4 at 1 h and 15 h after cell assembly.

The impedance spectra for Example 5 were almost identical to that shown in FIG. 1B for Example 4.

The comparison of FIGS. 1(a) and 1(b) shows that the electrodes produced according to Example 1 have much lower surface resistance, are more stable and less prone to passivation in electrolyte systems.

Comparison 3—Overvoltage Vs. Number of Cycles of Porous and Foil Electrodes

The cells of Comparison 2 were exposed to galvanostatic cycling with i=0.5 mA/cm$^2$ and $Q_K$=1.0 mAh/cm$^2$.

Figure 2:
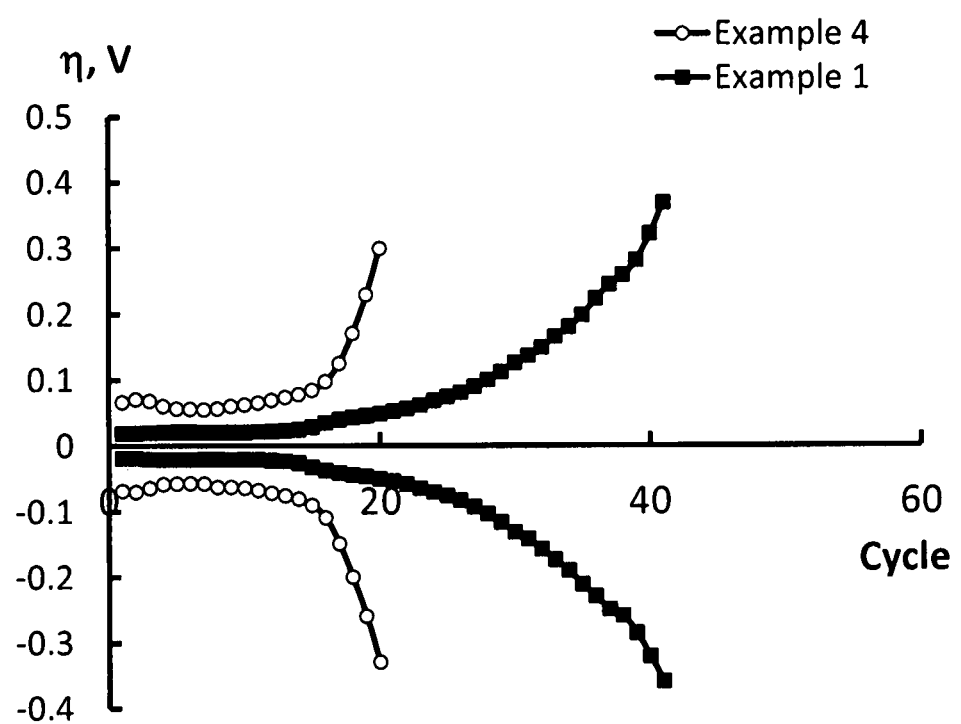
FIG. 2 is a comparison of overvoltage vs. number of cycles for the smooth lithium electrode of Example 4 and the composite porous lithium electrode of Example 1.

With reference to FIG. 2, the cell produced from the electrode of Example 1 was found to have a better cycle life than the cell produced from the electrode of Example 4.

Comparison 4—Lithium Surface Morphology According to Varying Porosity

Figure 3:
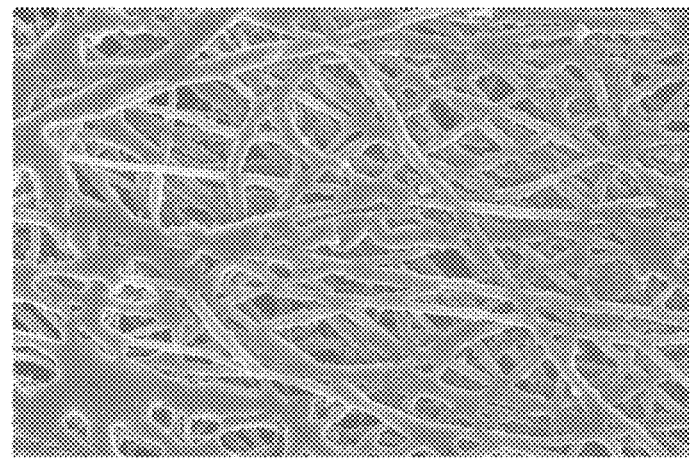
FIG. 3(a) is a scanning electron microscope (SEM) image of the morphology of the lithium surface of an electrode according to Example 2.
FIG. 3(b) is an SEM image of the morphology of the lithium surface of an electrode according to Example 3.
Figure 3:
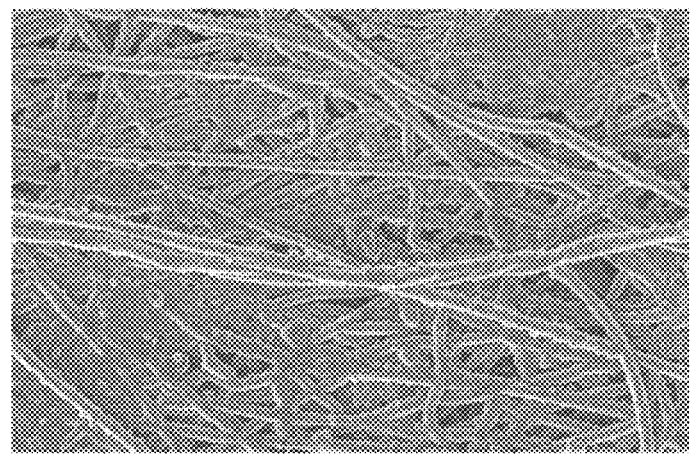

A scanning electron microscope (SEM) was used to image the lithium surface of electrodes according to Examples 2 and 3. A comparison of the surface morphologies of the electrodes of Examples 2 and 3 is shown in FIG. 3.

FIG. 3(a) shows the morphology of the lithium surface of a 70% porous electrode according to Example 2. FIG. 3(b) shows the morphology of the lithium surface of a 45% porous electrode according to Example 3.

Comparison 5—Electrochemical Properties According to Varying Porosity

The electrochemical properties of lithium composite material with different levels of porosity (Examples 2 and 3) were investigated by galvanostatic cycling and electrical impedance.

The studies were carried out in a two-electrode electrochemical cell (a so-called half-cell). The working and counter electrodes were manufactured as described in Example 2 and Example 3. All cells incorporated a microporous polypropylene separator, (Celgard 3501™), which was soaked with electrolyte solution made of 1 M lithium perchlorate (LiClO$_4$) in sulfolane.

The composition of the working and counter electrodes was as follows:
(1) Li/NPP—lithium deposited on non-woven polypropylene, Q=2 mAh/cm$^2$, prepared as described in Example 2 (70% porosity).
(2) Li/NPP—lithium deposited on non-woven polypropylene, Q=2 mAh/cm$^2$, prepared as described in Example 3 (45% porosity).

The corresponding impedance hodographs are presented in FIGS. 4 (a) and (b), with the following parameters: i=±0.2 mA/cm$^2$, U=±0.5 V, room temperature.

The cell assemblies as described above were also cycled in galvanostatic cathodic-anodic mode with the following parameters: $i_c$=$i_a$=0.2 mA/cm$^2$; $Q_c$=0.3 mAh/cm$^2$, U=±0.5 V, room temperature. The relationship between overvoltage and cycle number is presented in FIGS. 5 (a) and (b).

The sample of Example 2 (FIG. 5(a)) demonstrated significantly better cycle life at lower impedance (FIG. 4(a)) than the sample of Example 3 which is characterized by lower porosity.

The invention claimed is:

1. A permeable composite material for making an electrode for an electrochemical cell, the composite material comprising:
    a support comprising a fibrous woven or non-woven material defining pores; and
    an adherent alkali metal vapour deposit on opposed faces of the support and within a plurality of said pores,
    wherein internals of the support with alkali metal vapour deposit thereon define through pores from a first side of the composite material to a second side of the material.

2. The composite material of claim 1, wherein the material has a porosity in the range of from 10% to 95% v/v.

3. The composite material of claim 1, wherein the material has a JIS Gurley value in the range of from 10 to 5000 sec.

4. The composite material of claim 1, being generally planar with opposed faces defining a thickness of the material, the thickness being in the range of from 15 to 80 μm.

5. The composite material of claim 1, wherein the support comprises a polymeric material formed from one or more ethylenically unsaturated monomers.

6. The composite material of claim 1, wherein the support comprises a polypropylene non-woven fabric.

7. The composite material of claim 1, wherein the alkali metal consists of lithium metal or a lithium alloy.

8. A method of making a permeable composite material for making an electrode for an electrochemical cell, the method comprising: providing a support comprising a fibrous woven or non-woven material defining through pores from a first side of the support to a second side of the support; and vapour depositing alkali metal onto opposed faces of the support and within a plurality of said pores to form said composite material, the composite material retaining through pores defined by one or more internal walls of the support with alkali metal deposit thereon.

9. The method of claim 8 comprising physical vapour deposition of the alkali metal.

10. The method of claim 8 comprising evaporating alkali metal and depositing the evaporated lithium onto the support under a vacuum.

11. The method of claim 10 wherein the alkali metal is deposited under a vacuum having a pressure in the range of from $10^{-3}$ mbar a to 0.1 mbar a.

12. The method of claim 11 wherein the vacuum has a pressure in the range of from $10^{-3}$ mbar a to $10^{-2}$ mbar a.

13. The method of claim 8 wherein the alkali metal is deposited at a rate in the range of from 2 to 8 mAh per $cm^2$ of support per minute.

14. The method of claim 8 comprising evaporating alkali metal under a pulsed application of heat and depositing the evaporated lithium onto the support under a vacuum.

15. The method of claim 8 comprising calendaring the composite material.

16. An electrode for an electrochemical cell comprising a composite material according to claim 1, a connection terminal and optionally a current collector.

17. An electrode assembly comprising an anode, a cathode and a separator positioned therebetween, wherein the anode is an electrode according to claim 16.

18. An electrochemical cell comprising an electrode according to claim 16.

19. The cell of claim 18, wherein the cell is a primary cell or a secondary cell.

20. The cell of claim 18, wherein the cell is a lithium-ion cell.

21. The cell of claim 18, wherein the cell is a lithium-sulphur cell comprising an electrode according to claim 16 as the anode, a sulphur-containing cathode and an electrolyte.

* * * * *